(12) United States Patent
Yi

(10) Patent No.: US 6,788,679 B1
(45) Date of Patent: Sep. 7, 2004

(54) APPARATUS AND METHOD FOR CONFIGURING MULTICASTING NETWORK IN ASYNCHRONOUS TRANSFER MODE SWITCHING SYSTEM

(75) Inventor: Gwang Yong Yi, Seoul (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/496,955

(22) Filed: Feb. 3, 2000

(30) Foreign Application Priority Data

Feb. 5, 1999 (KR) .......................................... 4043/1999

(51) Int. Cl.[7] .............................................. H04L 12/56
(52) U.S. Cl. ...................... 370/388; 370/390; 370/411; 370/432
(58) Field of Search ................................ 370/231, 235, 370/386, 388, 389, 390, 395.1, 411.428, 429, 432; 709/238, 249

(56) References Cited

U.S. PATENT DOCUMENTS

| | | | |
|---|---|---|---|
| 4,813,038 A | | 3/1989 | Lee ............................. 370/60 |
| 5,305,311 A | * | 4/1994 | Lyles ............................ 370/60 |
| 5,312,951 A | * | 5/1994 | Herrmann et al. ........... 370/395 |
| 5,325,356 A | * | 6/1994 | Lyles ............................ 370/60 |
| 5,440,549 A | * | 8/1995 | Min et al. .................... 370/394 |
| 5,511,070 A | * | 4/1996 | Lyles ........................... 370/411 |
| 5,636,210 A | * | 6/1997 | Agrawal ...................... 370/390 |
| 5,687,324 A | * | 11/1997 | Green et al. ................. 395/250 |
| 6,201,808 B1 | * | 3/2001 | Wang et al. ................. 370/390 |

* cited by examiner

Primary Examiner—Alpus H. Hsu
(74) Attorney, Agent, or Firm—Fleshner & Kim, LLP

(57) ABSTRACT

The present invention relates to a multicasting network apparatus and method for an ATM switching system having a banyan network and a route network which includes a header encoder part for generating a header, a boolean splitter network for copying a cell routed from the banyan network to thereby transmit the same to a route network. The boolean splitter network includes a plurality of boolean splitters, each of the boolean splitters includes the step of dividing the destination addresses of a cell into an upper group and a lower group and selecting an active port to thereby route the same. As described above, any extra translation table is not required owing to a cell copying operation according to the present invention, whereby the number of hardware components can be reduced, and an expansion can be easily performed.

14 Claims, 5 Drawing Sheets

THE CHARACTER OF "a~h" IS OUTPUT PORT OF THE BANYAN NETWORK.

A : ACTIVE    X : DON'T CARE    I : IDLE

APPARATUS AND METHOD FOR CONFIGURING MULTICASTING NETWORK IN ASYNCHRONOUS TRANSFER MODE SWITCHING SYSTEM

BACKGROUND OF THE INVENTION

1. Field of the Invention

The present invention relates to a multicasting network in an Asynchronous Transfer Mode(hereinafter called as "ATM") switching system and, more particularly, to a multicasting network in an ATM switching system for performing cell copying and routing using a space division switch.

2. Description of the Prior Art

In order to provide services like broadcasting, video, etc., a conventional ATM switch requires multicasting so that incoming cells are broadcasted to selected multiple outputs.

There are several methods for the design of multicasting. Among them, the method for providing each module(not shown) with a multicasting function, and the method for providing an extra copy network are frequently used.

FIG. 1 is a block diagram of a conventional ATM switch for performing the above-described multicasting procedure.

As illustrated in FIG. 1, a conventional ATM switch includes a copy network 10, a plurality of TNTs(Trunk Number Translators; hereinafter called as "TNTs 20-1~20-n"), and a route network 30.

The copy network 10 shown in FIG. 1 is a view illustrating an example of an operation, in which when a cell with destination addresses 0, 5, and 7 is inputted, a corresponding address loaded in a corresponding TNT is branched by a cell copy operation for multicasting, thereby being routed to the addresses 0, 5, and 7 of the route network 30.

The copy network 10 is configured as a nonblocking copy network for multicasting packet switching which is offered by Tony.T. LEE.

FIG. 2 illustrates an internal structure of the copy network which includes a running adder network 31, a dummy address encode 32, and a broadcast banyan network 33.

As a more detailed example, the configuration of the copy network 10 of FIG. 1 will be described as follows with reference to FIG. 2.

An incoming cell has a broadcast channel number (hereinafter, "BCN") and a fan out(hereinafter, "FO") header therein as illustrated in FIG. 2. The FO means the number of cells that is to be copied, that is, the number of multiconnections, and the BCN is a characteristic number representing multi-channel connections.

The maximum and minimum addresses are generated in the running adder network by the value of the FO, that is, the number of cells to be copied.

The above generation method means copying cells as many as the value of MAXA(Maximum Address)–MINA+1.

The cell copied as described above is translated to the destination addresses of the route network by the TNTs 20-1~20-n, the BCN, and a CI(Copy Identifier) illustrated in FIG. 1.

However, in order for the thusly configured conventional copy network to be configured as one switching system, a translation table and a translator as well as the route network are required, whereby hardware components are consumed greatly to thus increase the costs, and each of the components must be expanded in the case of an expansion for thus making the configuration complicated.

SUMMARY OF THE INVENTION

The present invention relates to an apparatus and a method for configuring a multicasting network in an ATM switching system and, more particularly, to an apparatus and a method for configuring a multicasting network in an Asynchronous Transfer Mode switching system in which cell copying and routing are performed using a space division switch, without using a translator and a translation table between a copy network and a route network compared to the conventional art, whereby the number of hardware components is reduced, and an expansion of the same is easily performed by the method of increasing the number of space switches during the expansion.

BRIEF DESCRIPTION OF THE INVENTION.

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS.

A multicasting network in an ATM switching system having a banyan network and a route network according to the present invention includes a header encoder part for generating a header to thereby route the same to the banyan network, and a BSN(Boolean Splitter Network; hereinafter called as "BSN") for copying a cell routed from the banyan network to thereby route the same to the route network.

In addition, the BSN includes a plurality of BSs(Boolean Splitters; hereinafter called as "BS"), each of the BSs divides destination addresses of a cell into an upper group and a lower group. In the case that an upper input port is activated, the destination address of a corresponding upper group is selected, and in the case that an upper input port is not activated but a lower input port is activated, the destination address of a corresponding lower group is selected.

A multicasting network in an ATM switching system according to the present invention includes a header encoder part 100, a banyan network 200, a BSN 300, and a route network 400.

The header encoder part generates a header that is to be routed and applies the generated header to the banyan network.

In addition, the banyan network branches a cell by the header applied from the header encoder, and transmits a corresponding payload from the header encoder part to a designated output port.

The BSN 300 performs a space switching according to the present invention, by which a real copy of a cell routed through the banyan network is produced, and then applied to the route network.

In the route network, the above cell is routed to the destination addresses.

An embodiment of the present invention will be described as follows with reference to the accompanying drawings.

First, the output of the header encoder part "na[i]" is a header that is to be used in the next boolean splitter network. The output of the header encoder part is formed of a corresponding "na[i]", that is, the multicasting destination addresses.

In the header encoder part, when the number of input ports is "n", the number of corresponding destination addresses na[i] is calculated at an arbitrary n-th port (herein, n=0, 1, 2, 3, 4, 5~, n−2, n−1) by the following mathematical expression, wherein "h[i]" indicates the number of fan out of a cell inputted to the i-th port.
[Mathematical Expression]

$$na[i] = \sum_{i=0}^{n} h[i] - 1$$

Figure 1:
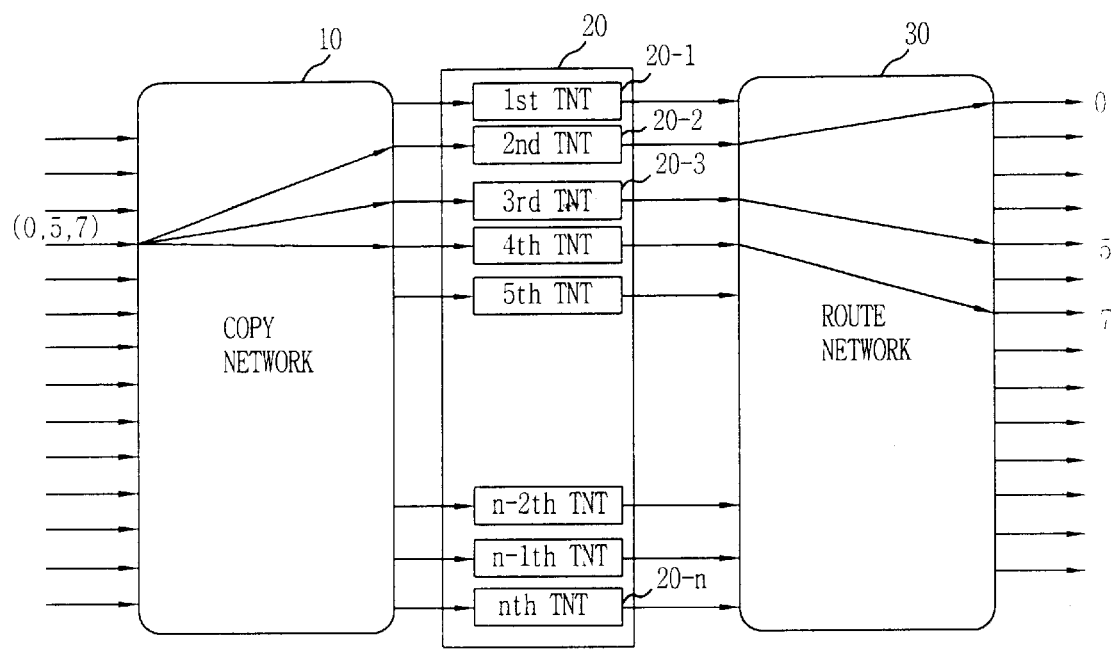
FIG. 1 is a configuration block diagram of a switching system of a conventional ATM switch.
Figure 2:
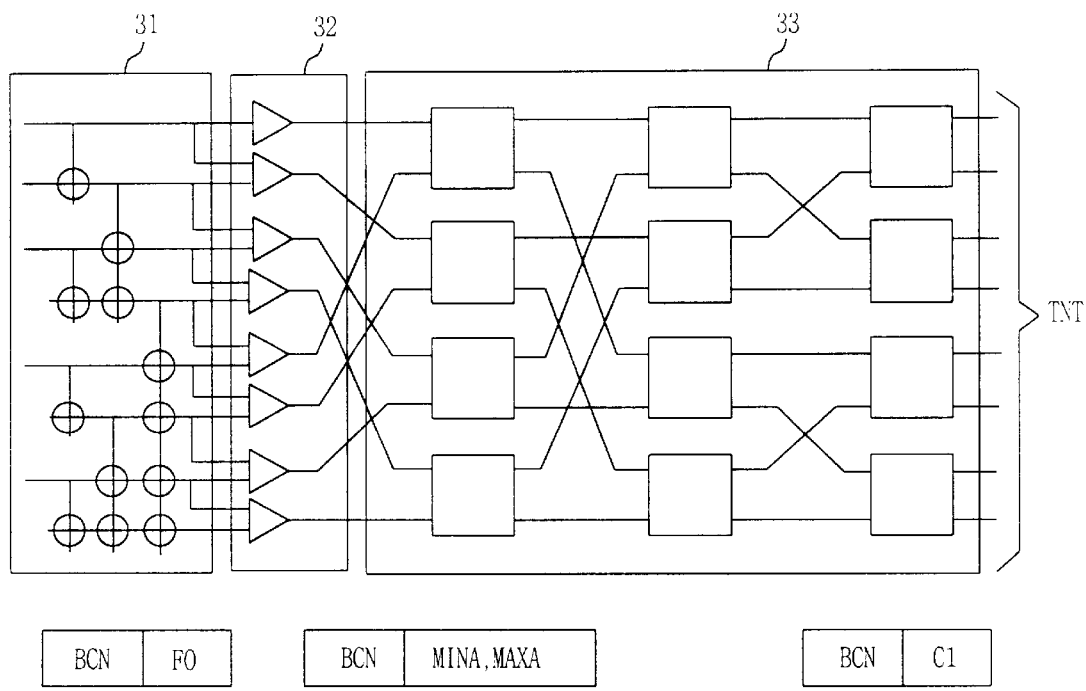
FIG. 2 is a configuration block diagram of a copy network in FIG. 1.
Figure 3:
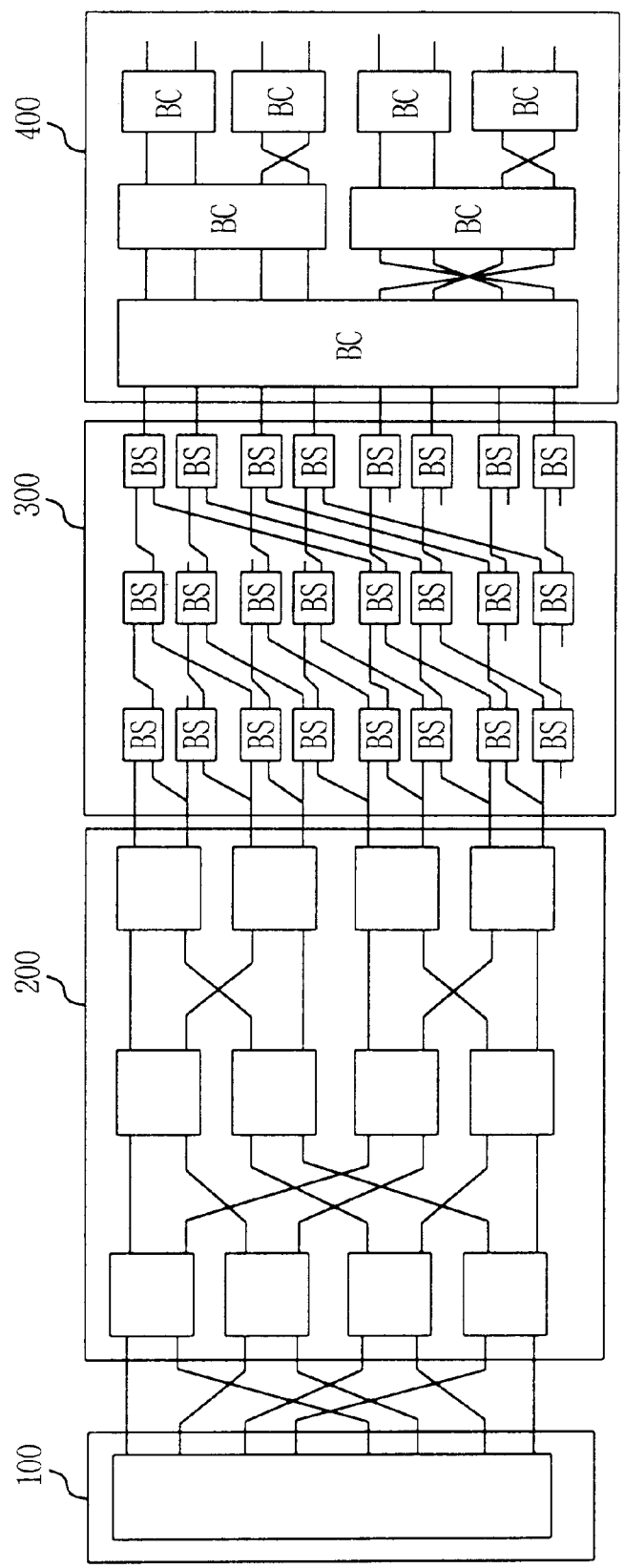
FIG. 3 is a block diagram illustrating a multicasting network in an ATM switching system according to the present invention.
Figure 4:
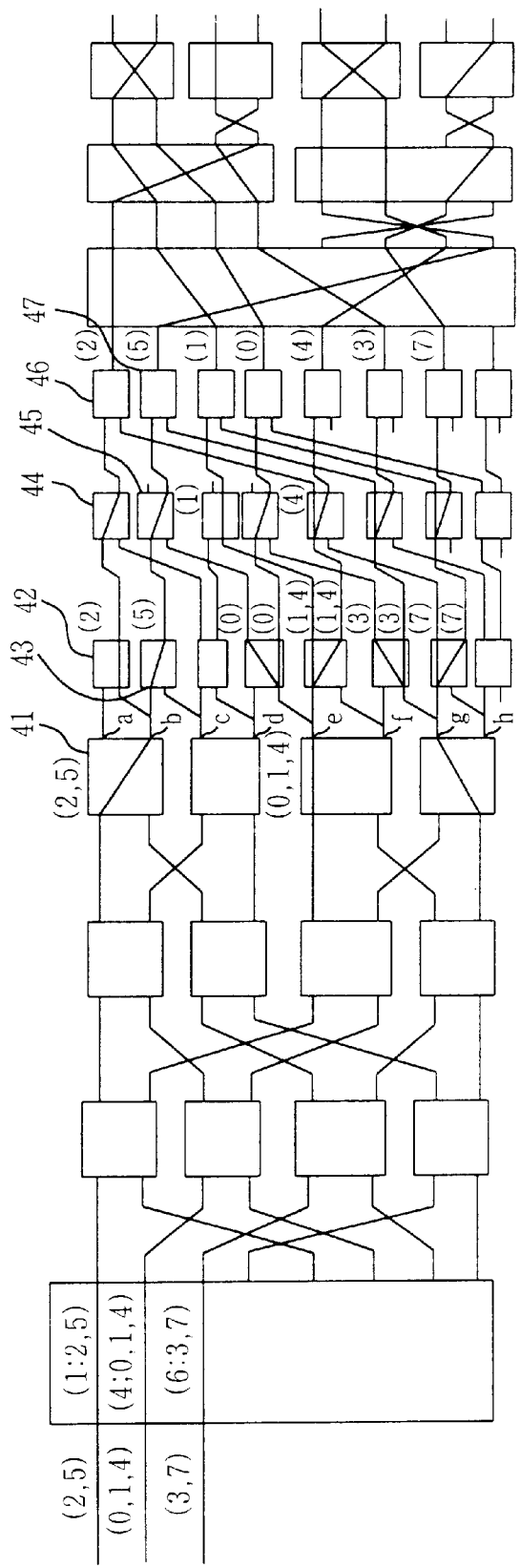
FIG. 4 is a configuration block diagram illustrating an embodiment of input cell multicasting in FIG. 3.

FIG. 4 is an example of an incoming cell multicasting operation in the case that the number of input-output ports of the multicasting network is 8, which will be described as follows with reference to the mathematical expression.

The output of the encoder part is formed of destination addresses and payloads of the banyan network. 1;2,5 in the header encoder part of FIG. 4 means that payload 2 and 5 are routed by using the port "b" of the output ports "a" through "h". Thus, when computing the value of the header encoder, since the destination address number is two (2 and 5), h[I] means 2 and the value obtained by subtracting 1, the value of the header, from h[I] becomes 1 in the above mathematical expression. That is, 1;2, 5 means a multicasing cell in which the value of na[i] is "1", and the destination addresses are "2" and "5".

After determining the value of the above port output, a routing process is performed based on the value of the above "na[i]" in the banyan network, and thereafter a cell copying is performed in the BSN.

The operation of a boolean splitter(hereinafter called as "BS") in the BSN will be described below with the reference to an embodiment of a cell inputted to the first port.

Since the destination addresses of the first input are two in the header encoder of FIG. 4, the output port of the banyan network obtains "b", and performs copying and transmission of a cell with the two destination addresses.

The characteristics of the banyan network satisfies nonblocking, the first input is routed to output port "b" of the output ports "a" through "h" in the banyan network. The destination addresses in the BN 41 of FIG. 4 are classified into an upper group and a lower group. The address in the upper group is branched to the address 2, and the address in the lower group is branched to the address 5.

In the case of reference numerals 44 and 45 of the BN in FIG. 4, the destination addresses of the input cell are branched to the output port of the BSN for thereby finishing the cell copy operation. In the case of switching using the BS, as shown in FIG. 4, it is considered that the destination addresses are routed to the output port without collisions.

With respect to the above cell copying and routing, branching is performed in accordance with the branching principle of the BS according to the present invention.

Figure 5:
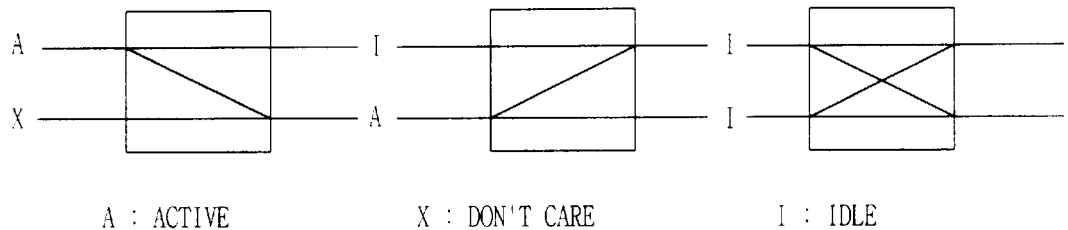
FIG. 5 is a configuration block diagram illustrating a branching principle of each BS in a BSN in FIG. 3.
Figure 6:
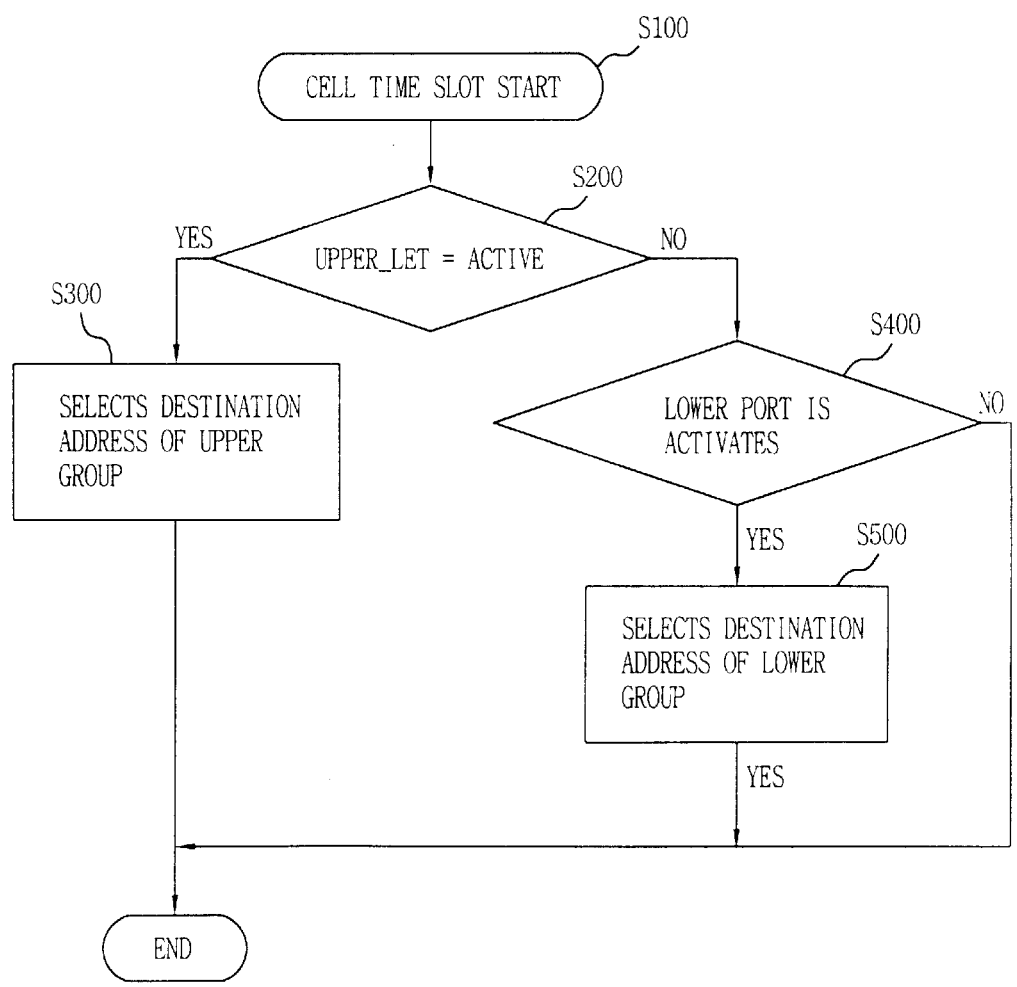
FIG. 6 is a flow chart illustrating a branching principle of each BS in a BSN in FIG. 3.

The configuration of the branching principle of the BS is illustrated in FIG. 5. In FIG. 5, "A" means an active input port, "X" means "Don't Care.", and "I" means an idle input port.

For a more detailed explanation, the branching principle of the BSs in the BSN will be described as follows with reference to the flow chart.

The process of branching a cell by the branching principle of the BSs in the BSN is a multicasting method which includes the steps of starting a cell time slot (S100), checking if the upper port of the input ports of each BS is an active port (S200), selecting only the destination addresses of the upper group (S300) if the upper port is an active port in step S200, checking if the lower port is an active port (S400) if the upper port is not an active port in step S300, selecting only the destination addresses of the lower group (S500) if the lower port is an active port, finishing the cell slot procedure after steps S300 and S500 if the lower port is not an active port.

After the cell copy procedure, routing is performed through the route network.

The route network is a point-to-point routing network configured as a binary concentrator which is nonblocking, whereby the output of the BSN satisfies the nonblocking condition.

Therefore, in the present invention, there are advantages that cell copying and cell routing are simultaneously performed in the multicasting network, any extra translation table between the copy network and the route network is not required for thereby reducing the number of hardware components, and a network expansion can be easily performed.

What is claimed is:

1. A multicasting network apparatus in a ATM switching system which comprises:
   a header encoder which generates a header that includes information for switching a data packet through a first network;
   a banyan network for switching the data packet, said first network including the banyan network;
   a boolean splitter network which copies the data packet as output from the banyan network and determines respective destination addresses for use to multicast the data packet and said copies; and
   a route network for multicasting the data packet based on the destination addresses determined by the boolean splitter network.

2. The apparatus of claim 1, wherein said header comprises addresses corresponding to ports of the banyan network and corresponding payloads.

3. The apparatus of claim 2, wherein the number of destination addresses is calculated by $$na = \sum_{i=0}^{n} h[i] - 1,$$

in which na[i] is included in the header information and is used for switching the data packet through the banyan network, and n-number of ports h[i] of the banyan network corresponds to a number of branches of the data packet inputted to the i-th port.

4. The apparatus of claim 3, wherein the value of na[i] is obtained by subtracting 1 from the number of addresses in said header, if the addresses in said header are two.

5. The apparatus of claim 3, wherein the value of H[i] corresponds to the number of addresses in said header.

6. The apparatus of claim 1, wherein said boolean splitter network includes a plurality of boolean splitters.

7. The apparatus of claim 6, wherein said plurality of boolean splitters branch addresses of the data packet and said copies to an upper group port and a lower group port, and then branch the data packet and said copies only to active ports.

8. The apparatus of claim 6, wherein said plurality of boolean splitters form an input port into state models including the active, Don't care, and idle states for branching the data packets and said copies.

9. A routing method for multicasting data in an ATM switching system, comprising:

switching a data packet through a banyan network based on header information;

discriminating destination addresses corresponding to the data packet for use by a route network to multicast the data packet;

searching for an active port of a boolean splitter network; and multicasting the data packet through the active port and route network based on the destination addresses.

10. The method of claim 9, wherein discriminating destination addresses comprises classifying said destination addresses into an upper group and a lower group according to a condition.

11. The method of claim 9, wherein searching for an active port comprises:

checking whether said upper port of two input ports of said boolean splitter network is activated; and checking whether a lower port of the two input ports is activated, when the upper port is not activated.

12. The method of claim 11, wherein said step of checking whether a port is activated comprises:

routing the data packet to the upper port, when said upper port is activated.

13. The method of claim 9, wherein when the data packet is inputted into two input ports of the boolean splitter network only one of which is an active port, the active port is selected.

14. The method of claim 9, wherein the boolean splitter network includes a plurality of boolean splitters having input states corresponding to active, idle, and Don't care states.

\* \* \* \* \*